US011609153B2

(12) United States Patent
Wang et al.

(10) Patent No.: US 11,609,153 B2
(45) Date of Patent: Mar. 21, 2023

(54) AUTOMOBILE TIRE BURST SIMULATION EXPERIMENT DEVICE

(71) Applicant: JILIN UNIVERSITY, Jilin (CN)

(72) Inventors: Jianhua Wang, Jilin (CN); Haiqiang Niu, Jilin (CN); Yuncheng Wang, Jilin (CN); Fei Xie, Jilin (CN); Weiyi Sun, Jilin (CN); Hua Chen, Jilin (CN); Xiaoyu Wang, Jilin (CN); Zhaowei Wang, Jilin (CN); Jinyan Li, Jilin (CN); Zaishang Hao, Jilin (CN); Jianfeng Tao, Jilin (CN); Ziyu Zhao, Jilin (CN); Xinqun Wang, Jilin (CN); Songqi Zhang, Jilin (CN)

(73) Assignee: Jilin University, Jilin (CN)

( * ) Notice: Subject to any disclaimer, the term of this patent is extended or adjusted under 35 U.S.C. 154(b) by 113 days.

(21) Appl. No.: 16/990,778

(22) Filed: Aug. 11, 2020

(65) Prior Publication Data
US 2021/0215575 A1 Jul. 15, 2021

(30) Foreign Application Priority Data
Jan. 10, 2020 (CN) .......................... 202010024148.4

(51) Int. Cl.
G01M 17/02 (2006.01)
B60C 99/00 (2006.01)

(52) U.S. Cl.
CPC .......... G01M 17/022 (2013.01); B60C 99/006 (2013.01)

(58) Field of Classification Search
CPC .. G01M 17/06; G01M 17/022; G01M 17/021; B60C 99/006
See application file for complete search history.

(56) References Cited

U.S. PATENT DOCUMENTS 5,313,827 A * 5/1994 Yovichin ............... G01M 17/02
73/146

FOREIGN PATENT DOCUMENTS

CN 110441073 A * 11/2019 .......... G01M 17/007
DE 3442347 A * 5/1986 ............. B60B 21/10

OTHER PUBLICATIONS

Linear Motor With Slides, Arduino Forum (https://forum.arduino.cc/t/linear-motors-with-slide/594305) (Year: 2019).*

* cited by examiner

Primary Examiner — Jennifer Bahls
Assistant Examiner — Quang X Nguyen
(74) Attorney, Agent, or Firm — Jeffrey D. Moy; Weiss & Moy, PC

(57) ABSTRACT

Disclosed is an automobile tire burst simulation experiment device, which is fixed on a rim installed with an automobile tire. The automobile tire burst simulation experiment device comprises a pre-tightening triggering device, a retracting device, a storage battery and a controller, the tire burst simulation experiment device according to the present invention uses two drive motors to drive two sets of roller screw slide rails, so as to drive the breakdown device away from and close to the tire to achieve a simulated tire burst and rapid deflation. The experiment device has the characteristics of quick installation, low cost, strong versatility, and adjustable speed; the device can be applied to the tire burst experiment under different vehicle speeds and road conditions of various automobile models. The structure is simple and the simulation control accuracy is high. After the tire burst, the subsequent experiments of the vehicle are not affected.

9 Claims, 2 Drawing Sheets

AUTOMOBILE TIRE BURST SIMULATION EXPERIMENT DEVICE

CROSS REFERENCE TO RELATED APPLICATION

This application claims the priority of Chinese Patent Application No. 202010024148.4 entitled "AUTOMOBILE TIRE BURST SIMULATION EXPERIMENT DEVICE", filed with the Chinese Patent Office on Jan. 10, 2020, which is incorporated herein by reference in its entirety.

TECHNICAL FIELD

The present invention relates to the field of vehicle experiment devices, in particular to an automobile tire burst simulation experiment device.

BACKGROUND

Tire burst, fatigue driving, and speeding are ranked as the three major killers of road traffic. However, since tire burst is unpredictable and uncontrollable, tire burst is also known as "number one killer" and "invisible killer." In recent years, due to the increase in the number of cars in China and the increase in highways, traffic accidents caused by tire burst always stay at a high level. According to authoritative statistics, at present, 46% of traffic accidents in highways in China are resulted from tire failures. A tire burst accounts for more than 70% of the total number of tire accidents. Therefore, the phenomenon of tire burst in high-speed driving cars and its impact on vehicle handling stability and countermeasures are issues that relevant scholars and companies have to face.

The current tire burst simulation experiment is achieved mainly by using the following three methods. A first method is to use the detonator explosion to achieve rapid deflation of the tire, but because the use of the detonator is strictly restricted, transportation and use are extremely inconvenient, and the cost is very high; a second method is to use a solenoid valve to control the rapid deflation device to achieve rapid deflation of the tire, but the deflation device needs to be specially made and is only suitable for specific hubs; a third method is to provide a device that punctures the tire on the road where the vehicle travels. It is easy for the driver to remember the placement position of the tire burst device, thereby reducing the suddenness and randomness of the tire burst. The driver may be intimidated to relax the accelerator when approaching the predetermined tire burst area, thus failing to reach the required speed, weakening the effect of the tire burst exercise and widening the gap with the actual high-speed tire burst situation.

SUMMARY

The object of the present invention is to solve the shortcomings in the prior art, and to provide a simulated tire burst experimental device that can realize tire burst simulation, rapid deflation, quick installation, low cost, strong versatility, and adjustable speed.

To achieve the above object, the present invention is implemented according to the following technical solution:

An automobile tire burst simulation experiment device, which is fixed on a rim installed with an automobile tire, wherein the automobile tire burst simulation experiment device comprises a pre-tightening triggering device, a retracting device, a storage battery, and a controller;

the retracting device comprises a first roller screw slide rail and a first drive motor, the first roller screw slide rail is fixed on the rim perpendicular to the plane of the rim, the first drive motor is fixed at the top end of the base of the first roller screw slide rail, and the output shaft of the first drive motor is axially fixedly connected to one end of the screw of the first roller screw slide rail by a first coupler;

the pre-tightening triggering device comprises a second roller screw slide rail, a second drive motor, a breakdown device, and a breakdown support frame, the base of the second roller screw slide rail is fixed to the slider of the first roller screw slide rail by a first connecting plate, the first roller screw slide rail is distributed perpendicular to the second roller screw slide rail, the second drive motor is fixed at one end of the base of the second roller screw slide rail, the output shaft of the second drive motor is axially fixedly connected to one end of the screw of the second roller screw slide rail by a second coupler, one end of the breakdown device support frame is fixed to the slider of the second roller screw slide rail by a second connecting plate, the breakdown device is provided at the other end of the breakdown device support frame, the axis of the breakdown device is perpendicular to the plane of the rim, and the contact of the breakdown device points to the thinner side wall of the tire;

the storage battery is connected to the first drive motor, the second drive motor, and the controller through a wire, and the controller is used to drive forward and reverse rotation of the first drive motor and the second drive motor.

Further, the axis of the screw of the first roller screw slide rail coincides with the center of the rim.

Further, the axis of the output shaft of the second drive motor and the breakdown device support frame are in the same plane and parallel to the plane of the rim.

Still further, the first roller screw slide rail is installed on the rim through a flange, the flange is provided with a groove, the slide rail passes through the groove by bolts and is fixedly connected to the installing hole on the rim, the center of the flange coincides with the center of the rim, the bottom of the base of the first roller screw slide rail is connected to the groove on the flange by bolts.

Preferably, the breakdown device is detachably connected to the breakdown device support frame.

Preferably, the base of the second roller screw slide rail and the first connecting plate are connected to the slider of the first roller screw slide rail by bolts.

Preferably, one end of the breakdown device support frame 9 and the second connecting plate are connected to the slider of the second roller screw slide rail by bolts.

Preferably, the storage battery and the controller are fixed on the side wall of the base of the first roller screw slide rail.

Preferably, the controller is wirelessly connected with a remote controller placed in the cab of the automobile, and the forward and reverse rotation of the first drive motor and the second drive motor is controlled by a remote controller.

Compared with the prior art, the present invention has the following beneficial effects.

The tire burst simulation experiment device according to the present invention uses two drive motors to drive two sets of roller screw slide rails, so as to drive the breakdown device away from and close to the tire to achieve a simulated tire burst and rapid deflation. The experiment device has the characteristics of quick installation, low cost, strong versatility, and adjustable speed; the device can be applied to the tire burst experiment under different vehicle speeds and road conditions of various automobile models. The structure is simple and the simulation control accuracy is high. After the tire burst, the subsequent experiments of the vehicle are not affected.

The tire burst simulation experiment device of the present invention realizes the pre-tightening, triggering and retracting actions through the wired control of the drive motor, which is convenient and reliable to control.

The power supply of the drive motor of the present invention adopts a mobile storage battery, and the forward and reverse rotation of the first drive motor and the second drive motor can be controlled by a remote controller placed in the cab of the automobile, which is convenient for the personnel in the vehicle to control the experiment.

In the figures: 1, a tire, 2, a rim, 3, a flange, 4, a second drive motor, 5, a second coupler, 6, a screw of the second roller screw slide rail, 7, a slide rail of the second roller screw slide rail, 8, a second connecting plate, 9, a breakdown device support frame, 10, a breakdown device, 11, a contact of the breakdown device, 12, a first drive motor, 13, a coupler, 14, a screw of the first roller screw slide rail, 15, a slide rail of the first roller screw slide rail, 16, a first connecting plate, 17, a slider of the second roller screw slide rail, 18, a controller.

DESCRIPTION OF THE EMBODIMENTS

In order to make the objectives, technical solutions and advantages of the present invention more clear, the present invention will be further described in detail in conjunction with the embodiments hereinafter. The specific embodiments described herein are only used to explain the present invention, rather than limit the present invention.

Figure 1:
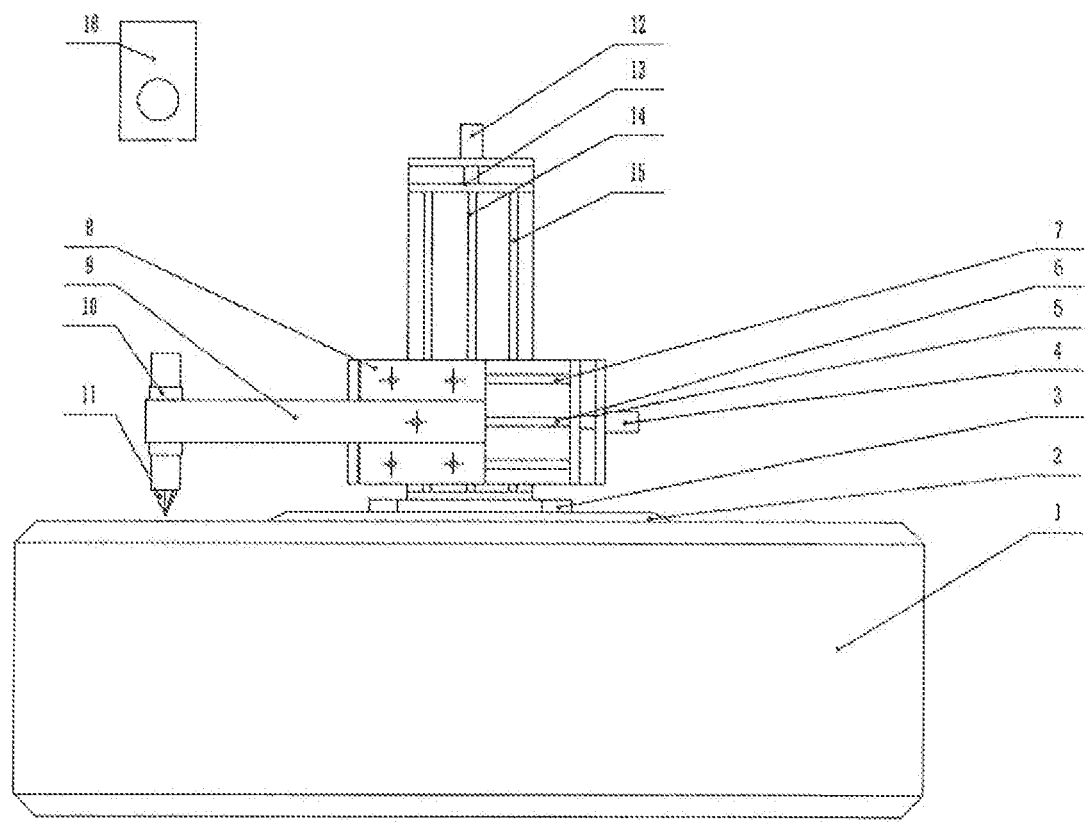
FIG. 1 is a front view of an automobile tire burst simulation experiment device in a pre-tightened state according to the present invention.
Figure 2:
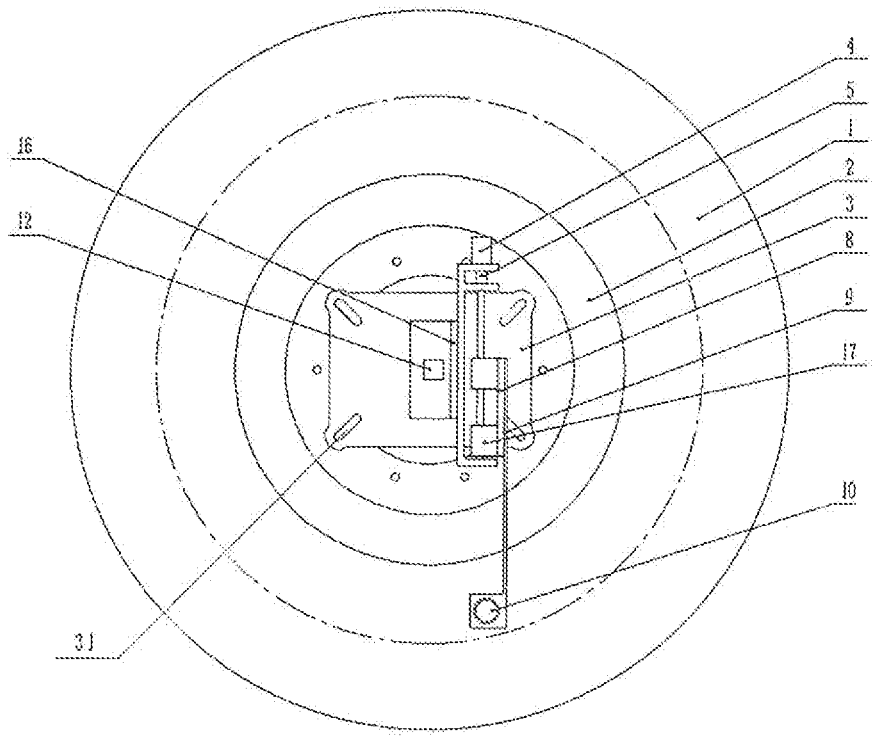
FIG. 2 is a top view of an automobile tire burst simulation experiment device in a pre-tightened state according to the present invention.

As shown in FIGS. 1 and 2, an automobile tire burst simulation experiment device of this embodiment is fixed on a rim 2 installed with an automobile tire 1, wherein the automobile tire burst simulation experiment device comprises a pre-tightening triggering device, a retracting device, a storage battery, and a controller 18.

The retracting device comprises a first roller screw slide rail and a first drive motor 12, the first roller screw slide rail is installed on the rim 2 through a flange 3, the flange 3 is provided with a groove 31, and the flange 3 can be connected with different models of rims 2 and has good versatility. The slide rail passes through the groove 31 by bolts and is fixedly connected to the installing hole on the rim 2, the center of the flange 3 coincides with the center of the rim 2, and the bottom of the base of the first roller screw slide rail is connected to the groove 31 on the flange 2 by bolts; the first roller screw slide rail can be purchased directly on the market, so that its specific structure will not be described in detail. The first drive motor 12 is fixed at the top end of the base of the first roller screw slide rail, and the output shaft of the first drive motor 12 is axially fixedly connected to one end of the screw 14 of the first roller screw slide rail by a first coupler 13. The axis of the screw 14 of the first roller screw slide rail coincides with the center of the rim 2; the first drive motor 12 is used to drive the screw 14 of the first roller screw slide rail to rotate, thereby driving the slider of the first roller screw slide rail (of course, the lower end of the slider is provided with a screw nut (not shown in the figure) matched with the screw 14 of the first roller screw slide rail) to move linearly on the slide rail 15 of the first roller screw slide rail.

The pre-tightening triggering device comprises a second roller screw slide rail, a second drive motor 4, a breakdown device 10, and a breakdown support frame 9, and the first roller screw slide rail can be purchased directly on the market, so that its specific structure will not be described in detail. The base of the second roller screw slide rail is fixed to the slider 17 of the first roller screw slide rail by a first connecting plate 16, the base of the second roller screw slide rail and the first connecting plate 16 are connected to the slider of the first roller screw slide rail by bolts; the first roller screw slide rail is distributed perpendicular to the second roller screw slide rail, the second drive motor 4 is fixed at one end of the base of the second roller screw slide rail, the output shaft of the second drive motor 4 is axially fixedly connected to one end of the screw 6 of the second roller screw slide rail by a second coupler 5, the axis of the output shaft of the second drive motor 4 and the breakdown device support frame 9 are in the same plane and parallel to the plane of the rim 2, one end of the breakdown device support frame 9 is fixed to the slider 17 of the second roller screw slide rail by a second connecting plate 8, one end of the breakdown device support frame 9 and the second connecting plate 8 are connected to the slider 17 of the second roller screw slide rail by bolts; and the breakdown device 10 is detachably installed on the other end of the breakdown device support frame 9. Specifically, the other end of the breakdown device support frame 9 may be provided with a through hole through which the through breakdown device 10 passes, and then use a bolt to pass through the breakdown device support frame 9 into the through hole, so as to fix the breakdown device 10; the axis of the breakdown device 10 is perpendicular to the plane of the rim, and the contact of the breakdown device 10 points to the thinner side wall of the tire 1. The second drive motor 4 is used to drive the screw 6 of the second roller screw slide rail to rotate, thereby driving the slider 17 of the second roller screw slide rail (of course, the lower end of the slider is provided with a screw nut (not shown in the figure) matched with the screw 6 of the second roller screw slide rail) to move linearly on the slide rail 15 of the second roller screw slide rail, so as to drive the breakdown device support frame 9 to also move linearly along the slide rail of the second roller screw slide rail. In combination with the first roller screw slide rail, the second roller screw slide rail can be driven to move up and down linearly with respect to the plane of the rim, so as to adjust the contact 11 of the breakdown device to point to the thinner side wall of the tire 1.

The storage battery is connected to the first drive motor 12, the second drive motor 4, and the controller 18 through a wire, and the controller 18 is used to drive forward and reverse rotation of the first drive motor 12 and the second drive motor 14. The storage battery and the controller 18 may be fixed on the side wall of the base of the first roller screw slide rail.

Figure 3:
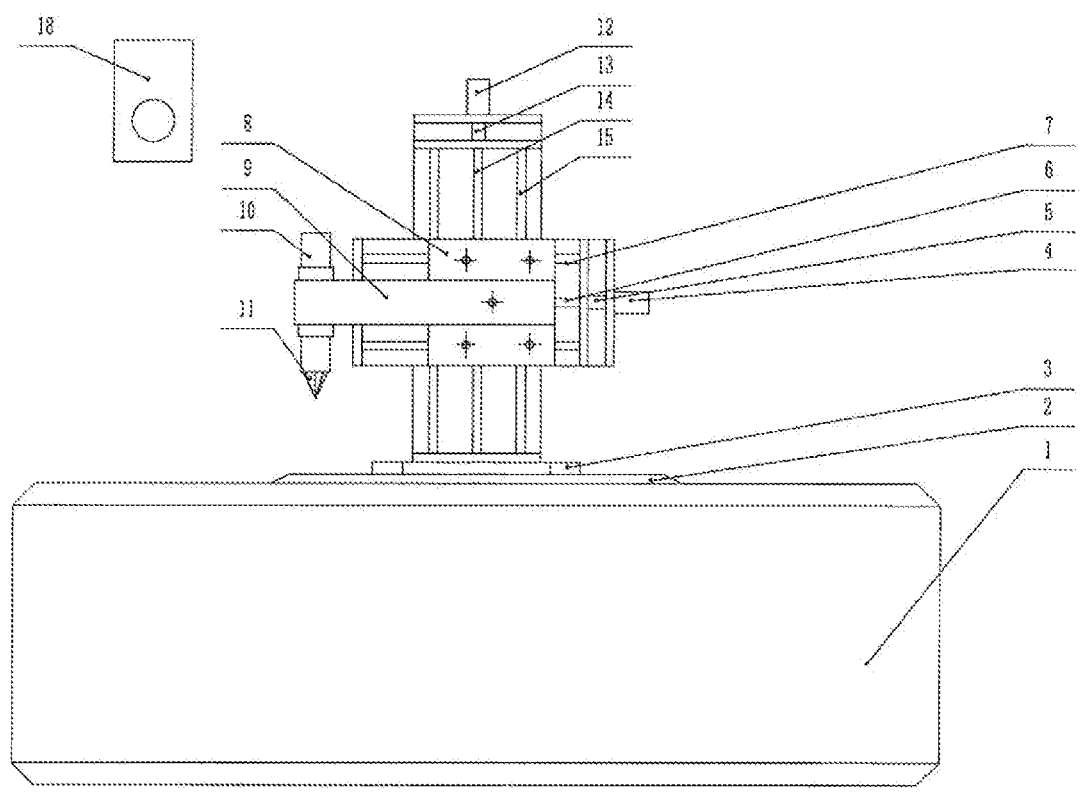
FIG. 3 is a front view of an automobile tire burst simulation experiment device in a retracted state according to the present invention.

When a tire burst simulation experiment is performed using the automobile tire burst simulation experiment device of this embodiment, the specific process is as follows: the controller 18 controls the second drive motor 4 to rotate forward, drives the screw 6 of the second roller screw slide rail to move, and drives the second connecting plate 8 to move, so that breakdown device 10 is above the thinner side wall of the tire 1; the controller 18 then controls the first drive motor 12 to rotate forward, drives the screw 14 of the first roller screw slide rail to move, and drives the first connecting plate 16 to move, and the pre-tightening triggering device moves with the first connecting plate 16, so that the contact part of the breakdown device 10 presses against the side of the tire 1 with a certain pre-tightening force, as shown in FIG. 1; thereafter, in the process of driving the car, when the tire burst command is received, the controller 18 continues to control the first drive motor 12 to rotate forward, and drives the entire pre-tightening triggering device to move in the direction closer to the tire 1, so that the breakdown device 10 continues to move to the side of the tire 1. The contact 11 of the breakdown device punctures the tire 1. After hearing the sound of a tire burst, the controller 18 controls the first drive motor 12 and the second drive motor 4 to rotate reversely, so that the pre-tightening triggering device is retracted to the range within the rim, as shown in FIG. 3. This is a static explosion experiment when the car is stationary. Of course, it can also be used for a tire burst experiment in the process of driving the car.

When used in a tire burst experiment in the process of driving the car, the controller 18 is wirelessly connected with a remote controller placed in the cab of the automobile, and the forward and reverse rotation of the first drive motor 12 and the second drive motor 4 is controlled by a remote controller. After the device is pre-tightened, the experimenter can return to the car and control through the remote controller, which avoids the risk that the tire burst may cause to the experimenter. It is convenient and safe.

In the present invention, after the tire burst, the controller 18 can control the drive motor 4 and the drive motor 12 to retract the device within the range of the rim, as shown in FIG. 3, which protects the device from colliding with the ground after the tire burst d. At the same time, the driver can continue to conduct the stability experiment after the tire burst, and the device does not affect the steering of the car.

The present invention can be used for static explosion experiment when the car is stationary, and can also be used for the tire burst experiment in the process of driving the car, both of which can truly simulate the situation of the automobile tire burst, which is of great significance for the subsequent handling stability research after the tire burst.

The technical solution of the present invention is not limited to the above specific embodiments, and any technical modification made according to the technical solution of the present invention falls within the protection scope of the present invention.

What is claimed is:

1. An automobile tire burst simulation experiment device, which is fixed on a rim installed with an automobile tire, wherein the automobile tire burst simulation experiment device comprises a pre-tightening triggering device, a retracting device, a storage battery, and a controller;

the retracting device comprises a first roller screw slide rail and a first drive motor, the first roller screw slide rail is fixed on the rim perpendicular to the plane of the rim, the first drive motor is fixed at the top end of the base of the first roller screw slide rail, and the output shaft of the first drive motor is axially fixedly connected to one end of the screw of the first roller screw slide rail by a first coupler;

the pre-tightening triggering device comprises a second roller screw slide rail, a second drive motor, a breakdown device, and a breakdown support frame, the base of the second roller screw slide rail is fixed to the slider of the first roller screw slide rail by a first connecting plate, the first roller screw slide rail is distributed perpendicular to the second roller screw slide rail, the second drive motor is fixed at one end of the base of the second roller screw slide rail, the output shaft of the second drive motor is axially fixedly connected to one end of the screw of the second roller screw slide rail by a second coupler, one end of the breakdown device support frame is fixed to the slider of the second roller screw slide rail by a second connecting plate, the breakdown device is provided at the other end of the breakdown device support frame, the axis of the breakdown device is perpendicular to the plane of the rim, and the contact of the breakdown device points to the thinner side wall of the automobile tire;

the storage battery is connected to the first drive motor, the second drive motor, and the controller through a wire, and the controller is used to drive forward and reverse rotation of the first drive motor and the second drive motor;

when a tire burst simulation experiment is performed using the automobile tire burst simulation experiment device, before a tire burst command is received, the contact part of the breakdown device of the pre-tightening triggering device presses against the thinner side of the automobile tire with a certain pre-tightening force; when the automobile tire burst command is received, the controller continues to control the first drive motor to rotate, and drives the pre-tightening triggering device to move in the direction towards an interior of the automobile tire, so that the breakdown device continues towards the interior of the automobile tire, and the contact of the breakdown device punctures the automobile tire.

2. The automobile tire burst simulation experiment device according to claim 1, wherein the axis of the screw of the first roller screw slide rail coincides with the center of the rim.

3. The automobile tire burst simulation experiment device according to claim 1, wherein the axis of the output shaft of the second drive motor and the breakdown device support frame are in the same plane and parallel to the plane of the rim.

4. The automobile tire burst simulation experiment device according to claim 1, wherein the first roller screw slide rail is installed on the rim through a flange, the flange is provided with a groove, the slide rail passes through the groove by bolts and is fixedly connected to the installing hole on the rim, the center of the flange coincides with the center of the rim, the bottom of the base of the first roller screw slide rail is connected to the groove on the flange by bolts.

5. The automobile tire burst simulation experiment device according to claim 1, wherein the breakdown device is detachably connected to the breakdown device support frame.

6. The automobile tire burst simulation experiment device according to claim 1, wherein the base of the second roller screw slide rail and the first connecting plate are connected to the slider of the first roller screw slide rail by bolts.

7. The automobile tire burst simulation experiment device according to claim 1, wherein one end of the breakdown device support frame and the second connecting plate are connected to the slider of the second roller screw slide rail by bolts.

8. The automobile tire burst simulation experiment device according to claim 1, wherein the storage battery and the controller are fixed on the side wall of the base of the first roller screw slide rail.

9. The automobile tire burst simulation experiment device according to claim 1, wherein the controller is wirelessly connected with a remote controller placed in the cab of the automobile, and the forward and reverse rotation of the first drive motor and the second drive motor is controlled by a remote controller.

* * * * *